United States Patent [19]

Fasen

[11] Patent Number: 5,995,315
[45] Date of Patent: Nov. 30, 1999

[54] SERVO SYSTEM FOR FOLLOWING A MAGNETIC TRACK HAVING IDENTIFYING PULSE WIDTHS

[75] Inventor: Donald J. Fasen, Boise, Id.

[73] Assignee: Hewlett-Packard Company, Palo Alto, Calif.

[21] Appl. No.: 08/853,241

[22] Filed: May 9, 1997

[51] Int. Cl.⁶ ..................................................... G11B 5/58
[52] U.S. Cl. ..................... 360/77.01; 360/77.12
[58] Field of Search ............................. 360/77.01, 77.12, 360/77.13, 119, 121, 122, 77.07, 77.11

[56] References Cited

U.S. PATENT DOCUMENTS

| | | | |
|---|---|---|---|
| 4,873,518 | 10/1989 | Mehnert | 340/825.07 |
| 4,897,746 | 1/1990 | Saito | 360/118 |
| 4,979,051 | 12/1990 | Eggebeen | 360/21 |
| 5,689,384 | 11/1997 | Albrecht et al. | 360/77.12 |

FOREIGN PATENT DOCUMENTS

690442A2  1/1996  European Pat. Off. .

*Primary Examiner*—Aristotelis M. Psitos
*Assistant Examiner*—Dan I. Davidson

[57] ABSTRACT

A servo system positions a read head for following a magnetic tape track by determining position information from a composite signal read from the tape by the read head. The servo system includes the read head, a discriminator circuit that provides a drive signal in response to the composite signal, and a head positioner that moves the read head in response to the drive signal. One frame of the composite signal in one embodiment includes four sync pulses followed by four position pulses. Sync pulses have a pulse width less than the pulse width of position pulses. The discriminator includes range check circuits that validate sync and position pulses and includes an arithmetic circuit that determines a ratio of sync-to-position time divided by sync-to-sync time. The discriminator provides the drive signal in response to a moving average of such ratios.

20 Claims, 4 Drawing Sheets

SERVO SYSTEM FOR FOLLOWING A MAGNETIC TRACK HAVING IDENTIFYING PULSE WIDTHS

FIELD OF THE INVENTION

Embodiments of the present invention relate to servo systems for positioning a head for following a track on a magnetic tape by determining position information from a signal read from the track and to methods and apparatus for prerecording such a signal.

BACKGROUND OF THE INVENTION

As an introduction to problems solved by the present invention, consider the conventional magnetic tape drive used for storing information from a personal computer. Such a tape drive records data on magnetic tape spooled inside a removable tape cartridge. The tape drive includes a read/write head and a transport mechanism for moving the tape across the head. Magnetic tape generally includes dozens of tracks arranged either parallel to a center line along the length of the tape or arranged in a helical fashion at an angle to the center line of the tape.

The conventional head is a laminated structure that includes a tiny gap for each track. The gap for a particular track is more narrow in width than the width of the track to allow for some misalignment of the tape on the head without the gap departing from the particular track. Misalignment is corrected by moving the head across the width of the tape so that the gap returns to the center line of the particular track. When the head is moved, all gaps are realigned. Therefore as the tape is transported across the head, a gap for reading data is continuously aligned over a data track when a second gap is maintained by servo control over a second track containing prerecorded information that indicates the extent of misalignment.

Conventional track following servo systems position a read head by determining position information from a signal read by the head from a servo track. Reliable head positioning is made difficult by variation in the quality of the signal. Such variation is attributable to many sources including, for example, defects in the tape, defects in the manner in which the servo track was prerecorded, defects and dimensional changes in the tape including stretching that occurred since the servo track was prerecorded, debris between the servo read head and the tape, variation in tape tension and speed across the read head, and noise sources common to electromechanical systems.

In conventional servo systems, these difficulties are met in part by employing complex prerecorded information at the expense of tape capacity. Servo system accuracy limitations reduce the maximum safe data recording density, having similar undesirable effects on tape capacity and seek time. Attempts to increase servo system stability and positioning accuracy have led to higher tape speed requirements so that more media is available for more complex servo signal patterns. Use of conventional servo system design techniques in applications having low tape speed results in low tape capacity and weak reliability.

As a consequence of such limitations, further improvement of tape system responsiveness at a computer system level is impeded. Tape systems serve personal backup, as well as institutional services. The limitations described above have economic impact on virtually everyone who operates a tape library, provides database management services, or operates a computer with an expectation of reliable data storage and quick retrieval.

In view of the problems described above and related problems that consequently become apparent to those skilled in the applicable arts, the need remains in track following servo systems for improved circuits and methods for determining position information from a signal read from tape and for improved methods and apparatus for prerecording such signals.

SUMMARY OF THE INVENTION

Accordingly, a servo write head in one embodiment of the present invention includes two gaps of different gap length, measured along a center line of the tape. When such a head is used to write a pattern of pulses onto a track, pulses of different widths result. Such pulses are easily discriminated, leading to more compact servo patterns, greater redundancy at high tape speed, and acceptable performance at low tape speed.

In another embodiment, the head as described above is characterized by a minimum distance between the two gaps that exceeds the gap length of both gaps. In one application, such a head is energized to create an interleaved series of pulses.

The invention may be practiced according to a method in one embodiment for prerecording onto a tape a regularly spaced series of magnetized regions for positioning a read head for reading the tape. The method includes the steps in sequence of providing a servo write head as described above, operating the write head, moving the tape along the center line a determined distance less than the minimum distance, and operating the write head a second time to provide the series for detection by a read head for a particular track of the plurality of tracks thereby providing a signal comprising a plurality of first pulses identifiable to the first gap and a plurality of second pulses identifiable to the second gap according to respective pulse widths. A time between one first pulse and one second pulse conveys position information for maintaining the read head on the particular track.

According to a first aspect of such a method, operation at low tape speed is facilitated. According to another aspect, a pattern sufficient for accurate servo control is placed on a shorter length of tape, allowing higher tape capacity for embedded servo techniques. According to yet another aspect, the pattern is repeated more frequently per unit length of tape, allowing greater servo positioning accuracy and responsiveness.

A servo system, according to still another embodiment, follows a magnetic tape track having a center line. The system includes a head, a discriminator circuit, and a head positioner. The head provides a composite signal in response to flux reversals in the track. The composite signal includes a plurality of pulses including a first signal having a first pulse width, a second signal having a second pulse width that differs from the first pulse width, and a third signal having a third pulse width that differs from the second pulse width.

The discriminator circuit provides a drive signal in response to the composite signal. The discriminator circuit includes a range check circuit, a timing circuit, and an arithmetic circuit. The range check circuit provides a first sync signal when the first pulse width is within a first range and provides a second sync signal when the third pulse width is within the first range.

The timing circuit identifies a first time in response to the first sync signal, identifies a second time in response to the second signal, and identifies a third time in response to the second sync signal.

The arithmetic circuit determines a first duration in response to the first time and the second time, determines a second duration in response to the first time and the third time, determines a ratio comprising the first duration divided by the second duration, and provides the drive signal in response to the ratio.

The head positioner moves the head toward the center line in response to the drive signal.

According to a first aspect of such a system, the head is accurately positioned when tracking a servo pattern written according to the preceding method. The benefits enumerated with the above description of the method are obtained by use of such a system.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

A person having ordinary skill in the art will recognize where portions of a diagram have been expanded to improve the clarity of the presentation.

In each timing diagram the vertical axis represents logic levels and the horizontal axis represents time. The vertical axis is intended to show the transition from active (asserted) to passive (non-asserted) levels of each logic signal. The voltages corresponding to the logic levels of the various signals are not necessarily identical among the various signals.

In each functional block diagram, a broad arrow symbolically represents a group of signals that together signify a binary code. For example, a group of address lines is represented by a broad arrow because a binary address is signified by the signals taken together at an instant in time. A group of signals having no binary coded relationship is shown as a single line with an arrow. A single line between functional blocks represents one or more signals. Signals that appear on several figures and have the same mnemonic are directly or indirectly coupled together.

DETAILED DESCRIPTION OF THE INVENTION

Figure 1:
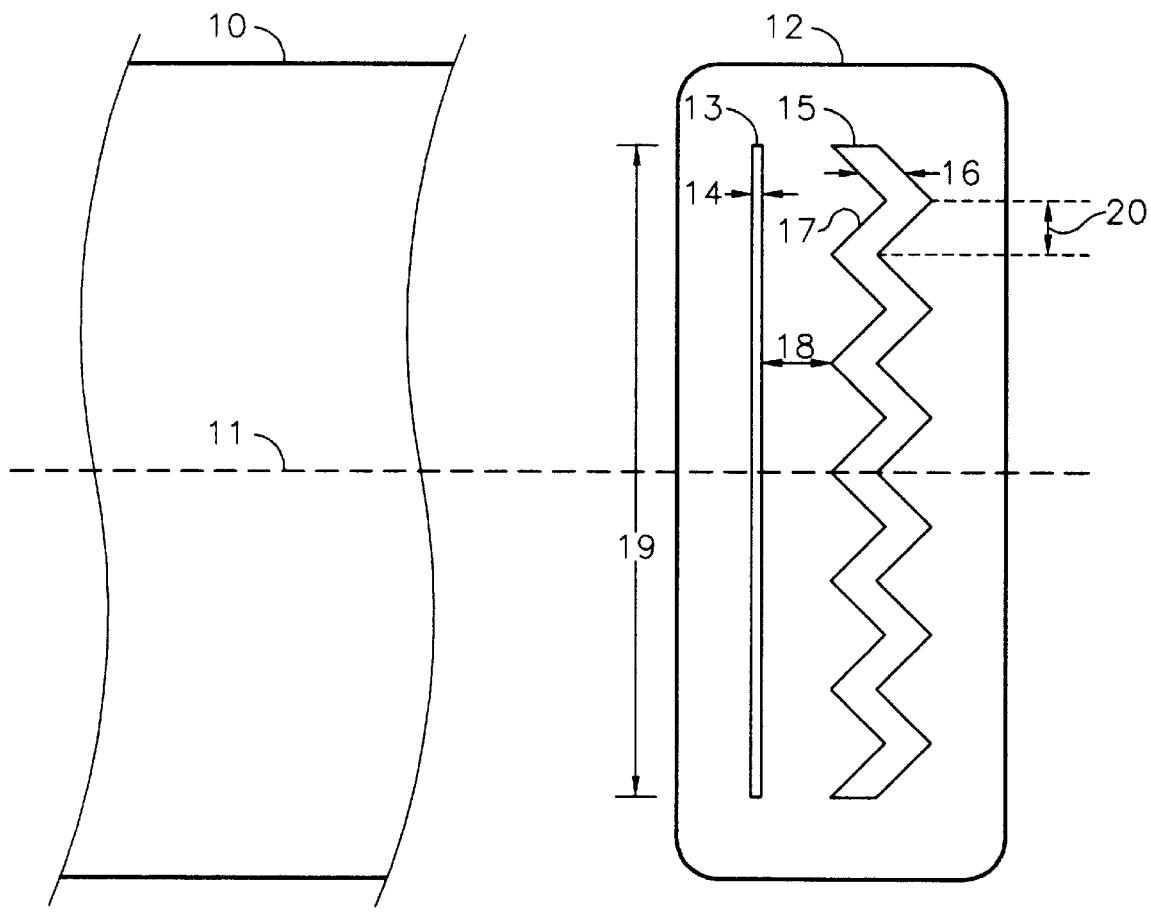
FIG. 1 is a front view of a servo write head aligned by a section of magnetic tape in one embodiment of the present invention.

FIG. 1 is a front view of servo write head 12 aligned by a section of magnetic tape 10 in one embodiment of the present invention. In operation, a length of tape 10 moves across head 12 along center line 11 of tape 10 to prerecord a servo pattern in all tracks simultaneously.

Head 12 is of conventional stacked laminate construction. Head 12 includes two magnetic flux gaps. When head 12 is energized, flux is developed in gaps 13 and 15 simultaneously and substantially uniformly throughout width 19 of each gap. Sync gap 13 has a narrow gap length 14, measured along a line parallel to the center line 11 of tape 10. Sync gap 13 extends straight across tape 10, i.e. in a straight line. Sync gap 13 is generally rectangular with its longest dimension oriented generally at a right angle to center line 11. Position gap 15 has a gap length 16, measured along a line parallel to center line 11 of tape 10, that is wider than gap length 14. Position gap 15 extends across tape 10 in a zigzag of equal and opposite azimuth orientations with respect to center line 11.

The distance between sync gap 13 and position gap 15 has a minimum distance 18 measured along a line parallel to center line 11. Minimum distance 18 is greater than distance 16, and therefore, also greater than distance 14. Minimum distance 18 is shown at one of several symmetric locations where gaps 13 and 15 are in close proximity to each other. All other symmetric locations exhibit the same minimum distance within conventional manufacturing tolerances. Minimum distance 18 is sufficient for creating interleaved patterns of pulses on tape 10 as will be more apparent below with reference to FIG. 3.

As shown for convenience, the orientation of head 12 and tape 10 is optimized for tracks parallel to centerline 11. In alternate embodiments, the orientation of tape 10 and head 12 are optimized for conventional helical track layout. In alternate embodiments a band includes many more that two tracks. A person of ordinary skill will understand how to practice the invention in its various embodiments with track layouts that differ from the layout shown having parallel tracks and two tracks per band.

Figure 2:
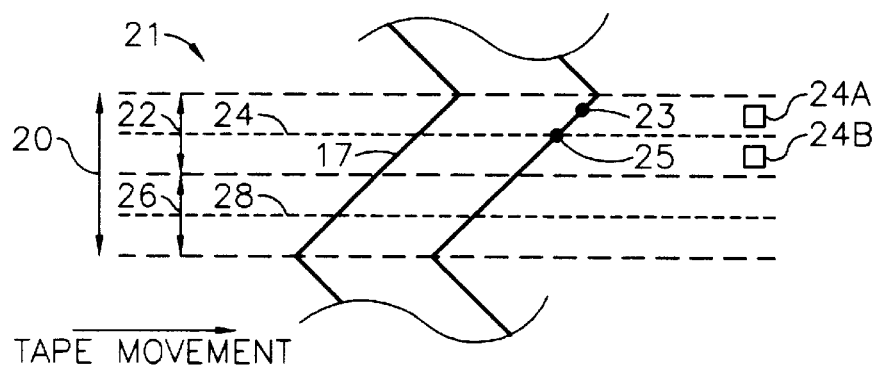
FIG. 2 is an expanded view of a portion of the servo write head and the tape shown in FIG. 1.

FIG. 2 is an expanded view of a portion of servo write head 12 and tape 10 shown in FIG. 1. Segment 17 of position gap 15 extends a distance 20 across a portion of tape 10 that includes a band of tracks. As shown, band 21 includes two tracks, 22 and 26, each having a respective center line 24 and 28. Track center lines 24 and 28 are parallel to tape center line 11. When a read head is located in position 24A, above center line 24, or in position 24B, below center line 24, it is a design goal of a track following servo system to move such a read head toward center line 24. Such motion is substantially at a right angle to center line 24.

Figure 3:
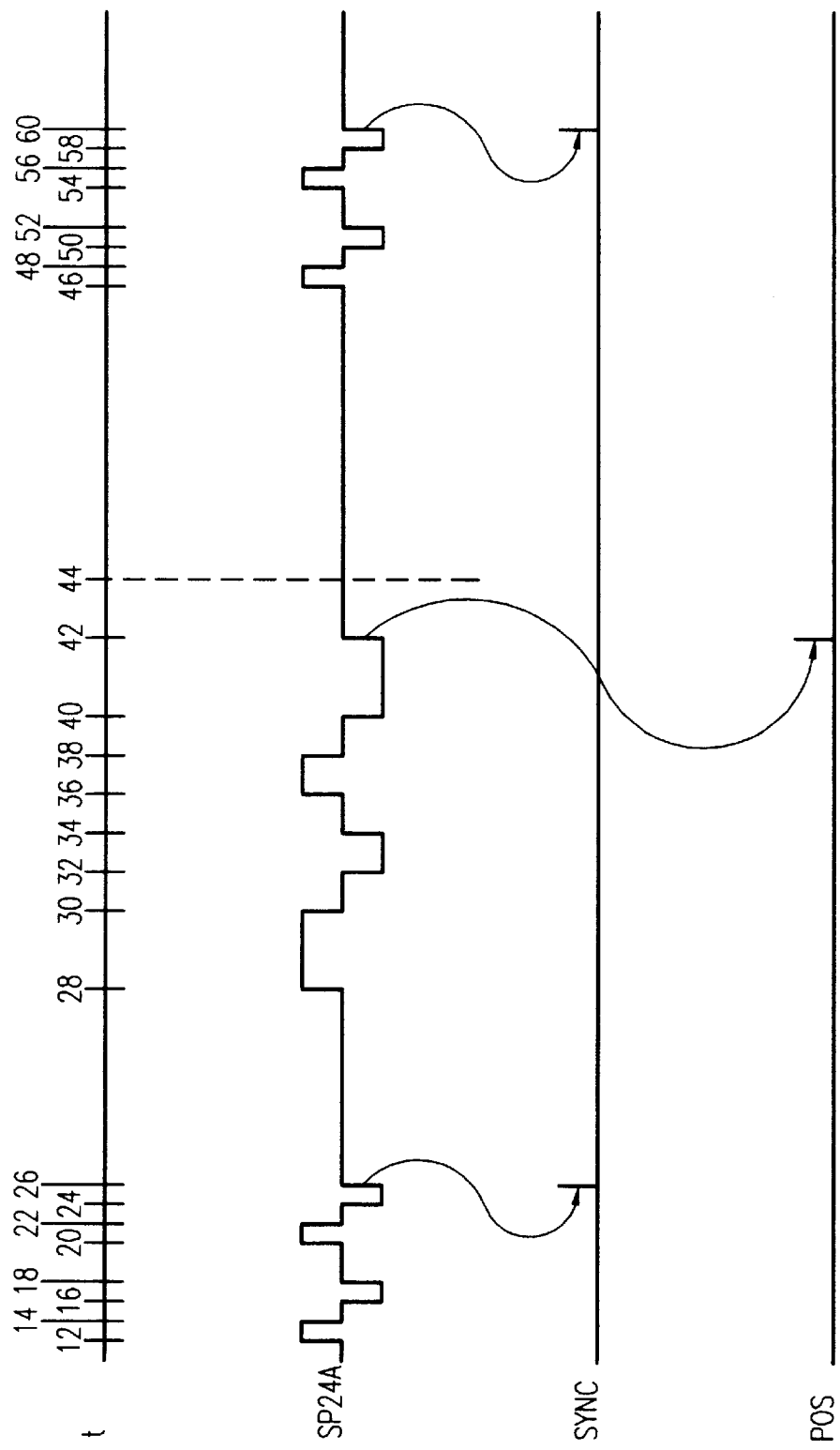
FIG. 3 is a timing diagram that illustrates a method of writing a servo pattern in one embodiment of the present invention.

FIG. 3 is a timing diagram that illustrates a method of writing a servo pattern in one embodiment of the present invention. In preparation for using tape 10 for the storage and retrieval of data, a servo pattern of the present invention is prerecorded on all tracks in one pass of tape 10 over servo write head 12. To write such a servo pattern according to a method in one embodiment of the present invention, an otherwise conventional servo writing tape transport is equipped with a servo write head of the type described with reference to FIG. 1. Such a method includes the following steps in sequence:

a. Operating head 12 to produce flux in both gaps 13 and 15 simultaneously across all tracks of tape 10;

b. Moving tape 10 along center line 11 a first distance less than minimum distance 18;

c. Operating head 12 to produce flux in both gaps 13 and 15 simultaneously across all tracks of tape 10;

d. Moving tape 10 along center line 11 a second distance; and e. repeating steps a. through d. to record a desired multiplicity of servo frames, each frame consisting of a regularly spaced series of magnetized regions produced in each execution of steps a. through d.

Precision is important for successfully performing the method. In steps a. and c., conventional circuitry is employed to energize head 12 for a precisely metered duration. Movement of the tape in one embodiment is continuous at a precisely calibrated speed. In such an embodiment, steps b. and d. are accomplished equivalently by waiting for the lapse of precisely prescribed time periods. In a preferred embodiment, step e. is repeated to prerecord the entire length of tape 10. As a result, a read head in any position, for example positions 24A and 24B in FIG. 2, on the width of tape 10 and at any position along the length of tape 10 will detect a pattern of pulses exemplified by signal SP24A in FIG. 3.

The top horizontal line of FIG. 3 identifies times t12 through t60 for reference. Signal SP24A illustrates a composite signal detected by a read head in position 24A of FIG. 2. Signal SP24A was produced in a conventional manner by amplifying and converting to logic levels the analog signal detected by a conventional read head as prerecorded according to the above method.

Pulse characteristics of signal SP24A correspond with particular method steps and are identifiable to features of head 12. Because sync gap 13 has a gap length less than the gap length of position gap 15, sync pulses have a characteristic pulse width less than a characteristic pulse width of position pulses. Sync pulses from t12 to t18 and position pulses from t28 to t34 correspond to method step a. Sync pulses from t20 to t26 and position pulses from t36 to t42 correspond to method step c. The duration t18 to t28 corresponds generally with minimum distance 18. The duration t18 to t20 and the duration t34 to t36 correspond generally to the tape movement of method step b. The duration t26 to t46 corresponds generally to the tape movement of method step d.

The portion of composite signal SP24A that includes a sync pulse is characterized by a pulse width. In one embodiment, such a pulse width is exemplified by duration t12 to t14. In an alternate embodiment, such a pulse width is exemplified by duration tl2 to tl8. In still another, such a pulse width is exemplified by duration t12 to t26. Using similar terminology, a pulse width characteristic of a position pulse is exemplified in various embodiments by durations t28 to t30, t28 to t34, and t28 to t42. Sync and position pulse widths constitute essential features for the operation of discriminator 111, discussed with reference to FIG. 4.

The duration t42 to t44, when normalized for tape speed, conveys information that indicates the extent of read head misalignment. A read head at position 24A, shown in FIG. 2, detects the final transition of the second position pulse sooner than if the read head were located at center line 24. This result follows from the fact that point 23 leads point 25 on the servo write head which prerecorded the signal being detected by the read head. The leading relationship is illustrated by signal SP24A in FIG. 3 having a difference in time between time t42 when the final transition is detected and time t44 when the final transition at center line 24 would have been detected.

Signals SYNC and POS are generated by a discriminator circuit to be described with reference to FIG. 4. Signals SYNC and POS are shown as narrow pulses in FIG. 3 to indicate the time when a proper sync or position pulse pattern has been detected. The selection of an appropriate indication, for example a voltage pulse or voltage transition, for the recognition of a pulse pattern is mere design choice within the skill of the ordinary designer.

Figure 4:
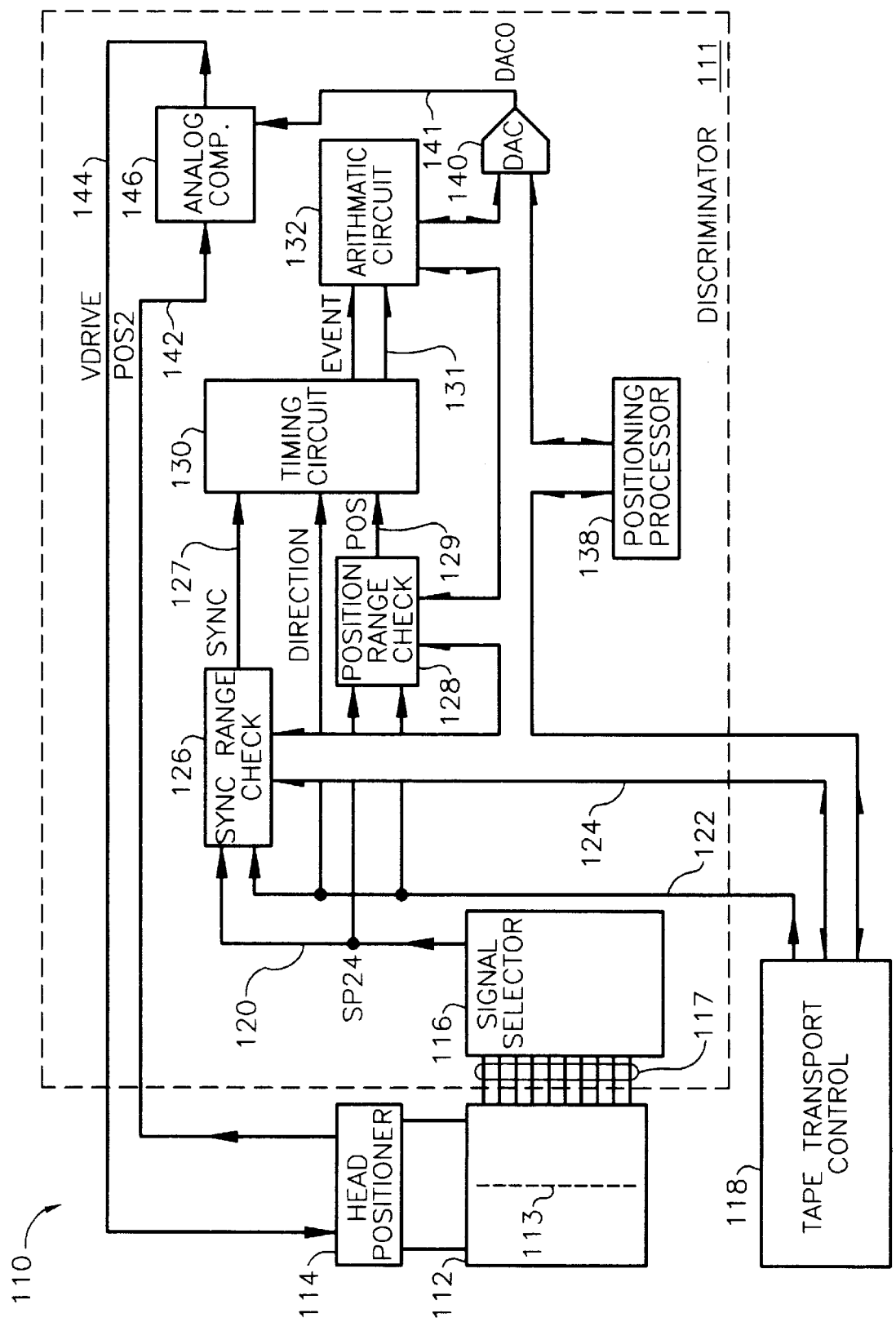
FIG. 4 is a functional block diagram of a servo system in one embodiment of the present invention.

FIG. 4 is a functional block diagram of a servo system in one embodiment of the present invention. Servo system 110 primarily includes read head 112, head positioner 114, tape transport control 118, and discriminator circuit 111. Read head 112 is of conventional stacked laminate construction. For simplicity, ten read gaps are illustrated, including read gap 113. Conventional heads employ one gap per data track plus one gap per dedicated servo track. The number of data and servo tracks is a matter of system design choice. Each read gap provides a composite signal when a prerecorded servo track is being read or provides a data signal when a data track is being read. The determination of which particular read head is expected to be positioned to read a servo track is another matter of design choice. One or more gaps provide signals on head interface 117. Such signals are weak currents associated with detecting magnetic flux reversals in the track being read.

Head positioner 114 is of the conventional type having an integral continuous position sensor such as a stepper motor in combination with a drive screw and a variable capacitor that varies capacitance with turning of the screw. Head positioner 114 moves head 112 in response to signal VDRIVE on line 144, provided by discriminator circuit 111. Head positioner 114 provides analog signal POS2 in response to the absolute position of head 112.

Tape transport control 118 manages movement of tape 10 across head 112 in forward read/write, reverse read/write, streaming, and start/stop modes of operation. Tape transport control 118 receives digital positioning commands on bus 124 and provides status both on bus 124 and on line 122. Signal DIRECTION on line 122 identifies tape 10 movement direction, for example forward or reverse, to discriminator 111 for improving servo control as will be discussed below. The structure and further operation of tape transport control 118 employ conventional electronic design.

Discriminator 111 recognizes sync pulses and position pulses amid other signals and noise received from head interface 117. Discriminator 111 provides improved immunity to variation in composite signal quality by acting only on pulse patterns that pass timing tests based on several characteristics of the composite signal SP24 on line 120 in FIG. 4 and illustrated for example as signal SP24A in FIG. 3. Discriminator 111 applies timing tests to reject noise and to identify portions of composite signal SP24 as valid for the derivation of position information.

Discrimination and normalization for tape speed may be better understood by referring to times identified in FIG. 3. There, composite signal SP24A includes one complete servo frame and the beginning of a second frame. The first servo frame extends from time t12 to time t46. The second servo frame extends beyond time t46. In each frame four sync pulses at time t12 to t26 precede four position pulses at time t28 to t42. Sync pulses are of substantially equal duration and proceed in pairs of opposite polarity pulses. Position pulses also proceed in pairs of opposite polarity pulses. In a pattern of position pulses, the first and last are of substantially equal duration and the middle two are of substantially equal duration. Finally, position pulse durations differ from sync pulse durations.

To implement appropriate timing tests, discriminator 111 primarily includes signal selector 116, sync range check circuit 126, position range check circuit 128, timing circuit 130, arithmetic circuit 132 and positioning processor 138. The appropriate gap signal of head interface 117 is selected and converted to digital logic levels by signal selector 116. Signal selector 116 provides composite signal SP24 on line 120 to range check circuits 126 and 128.

Sync range check circuit 126 performs timing tests on composite signal SP24 to provide signal SYNC on line 127 upon each occurrence of a valid sync pulse pattern. Position range check circuit 128 performs analogous tests to provide signal POS on line 129. Signals SYNC and POS are illustrated in FIG. 3. A detailed description of the structure and operation of range check circuit 126 follows with reference to FIG. 5. Range limits are conveyed on bus 124 to range check circuits 126 and 128 as prescribed by positioning processor 138 to be discussed below.

Timing circuit 130 provides signal EVENT on bus 131 in response to signals SYNC, POS, and DIRECTION. Timing circuit 130 primarily includes an encoder, a clock circuit, a counter, and a dual port memory organized as a first-in-first-out (FIFO) pipeline. The clock circuit and counter cooperate as a chronometer. When a SYNC or POS signal is received, timing circuit 130 stores an event code in the FIFO that includes the result of encoding the signal type (SYNC or POS), the current tape movement direction, and the current chronometer output count.

Arithmetic circuit 132 reads signal EVENT so as to routinely unload the FIFO of timing circuit 130. When a sequence of event codes is received which corresponds to SYNC and POS occurrences as illustrated in FIG. 3, arithmetic circuit 132 computes the following durations and ratios using conventional binary subtraction and division techniques. Results are then transferred to positioning processor 138.

The duration t26 to t60, representing frame duration, is computed by subtracting the chronometer values of consecutive sync event codes. Frame duration is proportional to tape speed according to a reference constant used to prerecord servo patterns on tape 10. Therefore, arithmetic processor 132 derives current tape speed from EVENT signal values.

The duration t26 to t42, representing current position, is computed by subtracting the chronometer value of a POS event from an immediately preceding SYNC event.

The duration t26 to t44, representing desired head position, is computed from several terms. Reference time t44 is obtained from tape speed, frame duration, and the chronometer value of a SYNC event. Allowance for track position within a band is made by a conventional algorithmic or table look-up techniques. The ratio of desired head position divided by frame duration represents desired position normalized for tape speed.

The ratio of current position divided by frame duration represents current position normalized for tape speed. A difference between current position normalized and desired position normalized is the servo system error signal.

For improved servo positioning accuracy, arithmetic circuit 132 computes running averages of the above durations and ratios. In alternate embodiments other conventional digital filtering techniques are employed to improve the so-called signal-to-noise ratio of these duration and ratio values.

Arithmetic circuit 132 provides the following data in averaged form (i.e. digitally filtered) and raw form to positioning processor 138 via bus 124: current tape speed, current position normalized, desired position normalized, and current error signal.

Positioning processor 138 is a microprocessor circuit of the type having substantial memory for program and data storage. Upon receipt of current tape speed, positioning processor updates pulse width ranges for sync range check circuit 126 and position range check circuit 128 via bus 124. In addition, positioning processor 138 employs conventional motor control algorithms for development of a digitally compensated motor drive signal based primarily on the current error signal provided by arithmetic circuit 132. Each value of the digitally compensated motor drive signal is provided for conversion to digital to analog converter (DAC) 140 via bus 124. DAC 140 provides output signal DACO on line 141.

Analog compensation circuit 146 combines signal DACO with signal POS2 from head positioner 114 to provide signal VDRIVE on line 144. The servo loop for head positioning responds to servo patterns read by head 113 from tape 10 and develops an accurate drive signal by applying sophisticated timing tests for the rejection of noise, digital filtering such as running averages of multiple frames, and digital and analog compensation. Noise rejection is primarily accomplished by real time range checking of the type performed by sync range check circuit 126 and position range check circuit 128.

Figure 5:
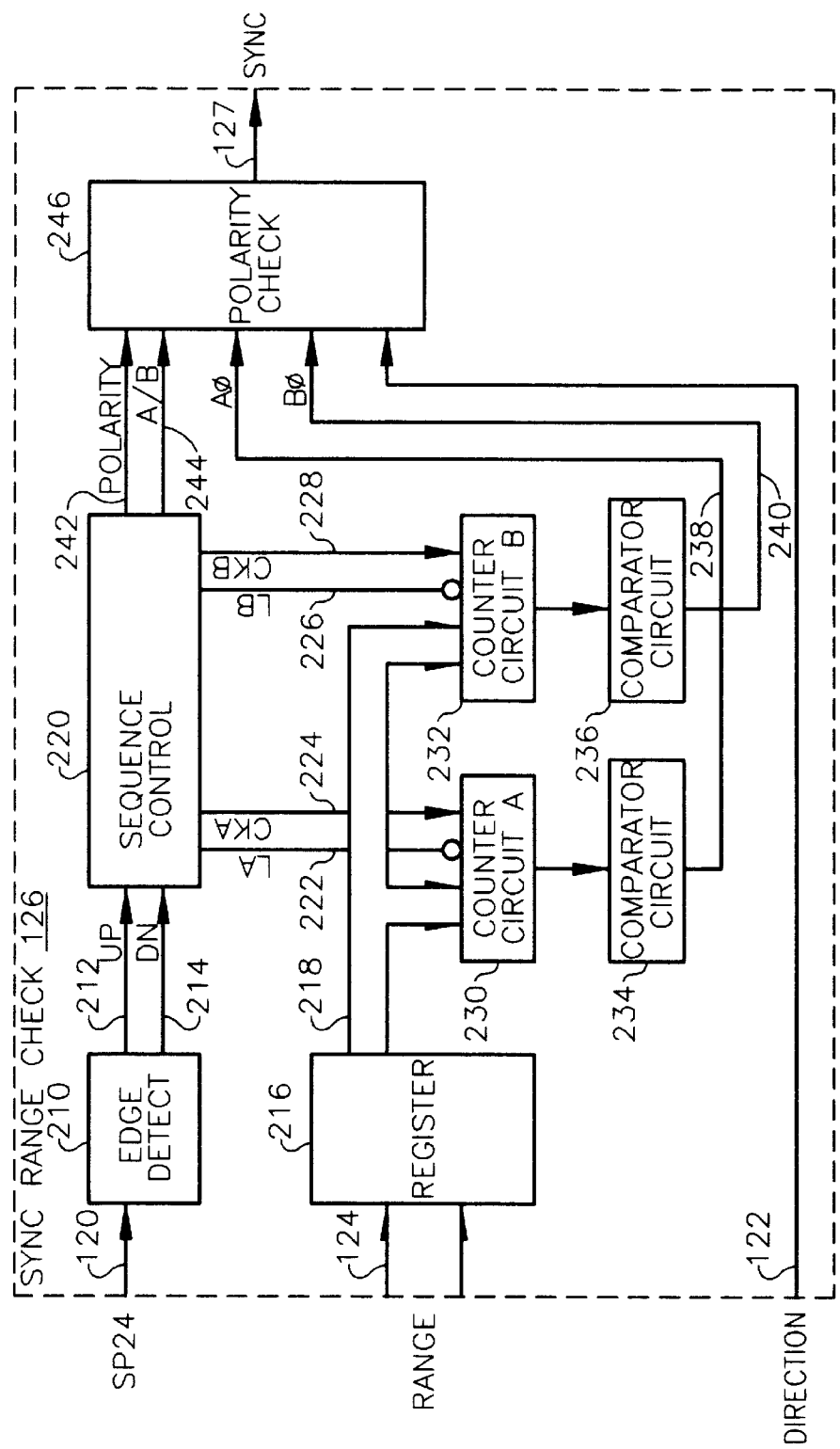
FIG. 5 is a functional block diagram of a range check circuit shown in FIG. 4.

FIG. 5 is a functional block diagram of the sync range check circuit 126 shown in FIG. 4. A functionally similar circuit is used for position range check circuit 128. Range check circuit 126 responds to transitions on composite signal SP24 to provide signal SYNC on line 127 when pulse widths and polarities conform to expected values. Intervening transitions block output of signal SYNC and reset component circuits using conventional reset and initialization techniques.

Sync range check circuit 126 primarily includes edge detect circuit 210, register 216, sequence control circuit 220, counters 230 and 232, comparator circuits 234 and 236, and polarity check circuit 246. Edge detect circuit 210 recognizes and classifies transitions on composite signal SP24 to provide signal UP on line 212 and signal DN on line 214 corresponding respectively to the rising and falling edges of binary logic signal SP24.

Register 216 receives a range value from positioning processor 138, shown on FIG. 4, and provides the range value to counter circuits A and B as an initial start count value.

Sequence control circuit 220 includes a clock circuit including an oscillator for time base generation. Sequence control circuit 220 also includes a state machine for coordinating operations of sync range check circuit 126 according to conventional digital logic design techniques.

Sequence control circuit 220 orchestrates duration measurement and polarity checking. These functions are described with reference to the times identified on FIG. 3. To measure sync pulse duration between times t12 and t14, for example, circuit 220 responds to signal UP by asserting signal LA on line 222 to load counter circuit A 230 from register 216 with an initial count value. Then, sequence control circuit 220 provides signal CLK A on line 224 until signal DN is received on line 214. Counter circuit A 230 counts down from the initial value to provide a terminal count near zero if the duration t12 to t14 is within range. The lowest several bits of the terminal count are ignored by comparator circuit 234 in determining whether the duration is within range.

Counter circuits A 230 and B 232 are identical in structure and function. Two independent counters are provided to support simultaneous termination of one count and initiation of another such as may occur between closely spaced pulses, at high tape speed, or as a result of other anomalies described above as variations in quality of the composite signal.

For polarity checking, sequence control circuit 220 enables polarity check circuit 246 when counting is terminated. Sequence control circuit then provides to polarity check circuit 246 signal POLARITY on line 242, and signal A/B on line 244. Signal POLARITY identifies the received polarity as indicated by whether signal UP or signal DN initiated counting. Signal A/B identifies which terminal count is valid: signal AO on line 238 or signal BO on line 240.

Polarity check circuit 246 provides signal SYNC when all of the following conditions are met: the correct number of pulses is received, each pulse has a pulse width within range, and the sequence of pulse polarities is consistent with the direction of movement of tape 10 as indicated by signal DIRECTION. When one or more of these conditions is not met, polarity check circuit 246 does not generate signal SYNC on line 127 and instead resets to begin the condition checklist afresh.

Variations in servo track composite signal quality that have been responsible for poor low speed tracking and excessive block seek time has considerably reduced effect on servo system 110 due in part to operation of discriminator circuit 111 whose functions rely on servo write head embodiments and servo pattern recording method embodiments of the present invention.

The foregoing description discusses preferred embodiments of the present invention, which may be changed or modified without departing from the scope of the present invention. For example, servo system 110, as described above, consists of conventional digital and analog electronic components designed and assembled using conventional techniques. Alternate embodiments include application specific integrated circuits, discrete state machines, switching logic, analog timing and computing circuits, and programmable microprocessors and microcontrollers. Such modifications are considered to be within packaging design choice by circuit, firmware, and software designers of ordinary skill.

Gap 15 in FIG. 1 illustrates an embodiment wherein any track on the tape can later be used as a servo track. In alternate embodiments, servo tracks are grouped or distributed in portions of the width of the tape, with attendant simplification of servo write head design.

While for the sake of clarity and ease of description, several specific embodiments of the invention have been described; the scope of the invention is intended to be measured by the claims as set forth below. The description is not intended to be exhaustive or to limit the invention to the form disclosed. Other embodiments of the invention will be apparent in light of the disclosure and practice of the invention to one of ordinary skill in the art to which the invention applies.

The words and phrases used in the claims are intended to be broadly construed. For example, a "signal" refers to mechanical and/or electromagnetic energy conveying information. When elements are coupled, a signal can be conveyed in any manner feasible in light of the nature of the coupling. For example, if several electrical conductors couple two elements, then the relevant signal comprises the energy on one, some, or all conductors at a given time or time period. When a physical property of a signal has a quantitative measure and the property is used by design to control or communicate information, then the signal is said to be characterized by having a "value." The amplitude may be instantaneous or an average.

What is claimed is:

1. A head for recording a flux pattern onto a magnetic tape, the tape having a center line along the length of the tape and a plurality of tracks parallel to the center line, the flux pattern for providing indicia for positioning a provided read head during operation of the read head, the head comprising:

a. a first flux gap that extends across the plurality of tracks, the first gap having a first gap length along the center line, the first gap operative to provide a rectangular flux pattern in each track thereby providing a first pulse having a first pulse width as the flux pattern is read by the read head from any track of the plurality of tracks; and b. a second flux gap that extends across the plurality of tracks, the second gap having a second gap length along the center line that differs from the first gap length, wherein operating the head creates flux in the first gap and in the second gap, the second gap operative to provide a parallelogram-shaped flux pattern in each track thereby providing a second pulse having a second pulse width as the flux pattern is read by the read head from any track of the plurality of tracks, the second pulse width differs from the first pulse width, and the indicia for positioning comprise a time between the first pulse and the second pulse.

2. The head of claim 1 wherein the first gap length is smaller than the second gap length.

3. The head of claim 1 wherein a minimum distance between the first gap and the second gap along a line parallel to the center line exceeds the first gap length and exceeds the second gap length.

4. The head of claim 1 wherein the first gap crosses the center line at a right angle and the second gap extends in a zigzag across the plurality of tracks.

5. A method for recording onto a tape a regularly spaced series of magnetized regions for providing indicia for positioning a read head during operation of the read head, the tape having a center line along the length of the tape and a plurality of tracks, the method comprising, in sequence:

a. providing a head wherein:
   (1) the head comprises a first gap that extends across the plurality of tracks, the first gap having a first length along the center line;
   (2) the head further comprising a second gap that extends across the plurality of tracks, the second gap having a second length along the center line that differs from the first length; and
   (3) a minimum distance between the first gap and the second gap along a line parallel to the center line exceeds the first length and exceeds the second length; and b. operating the head to produce flux in the first gap and in the second gap;

c. moving the tape along the center line a first distance less than the minimum distance;

d. operating the head to produce flux in the first gap and in the second gap;

e. moving the tape along the center line a second distance; and f. repeating steps b. through e. wherein the first gap in operation provides a rectangular flux pattern in each track thereby providing a first pulse having a first pulse width as the flux pattern is read by the read head from any track of the plurality of tracks, the second gap in operation provides a parallelogram-shaped flux pattern in each track thereby providing a second pulse having a second pulse width as the flux pattern is read by the read head from any track of the plurality of tracks, the second pulse width differs from the first pulse width, and the indicia for positioning comprise a time between the first pulse and the second pulse.

6. The method of claim 5 wherein the tracks are parallel to the center line.

7. A servo system for following a magnetic tape track, the track having a center line, the system comprising:
   a. a head that provides a composite signal in response to flux reversals in the track, the composite signal comprising a plurality of pulses, the plurality comprising:
      (1) a first signal having a first pulse width;
      (2) a second signal having a second pulse width that differs from the first pulse width; and
      (3) a third signal having a third pulse width that differs from the second pulse width;
   b. a discriminator circuit for providing a drive signal in response to the composite signal, the discriminator circuit comprising:
      (1) a first range check circuit that provides a first sync signal when the first pulse width is within a first range and provides a second sync signal when the third pulse width is within the first range;
      (2) a timing circuit that identifies a first time in response to the first sync signal, identifies a second time in response to detecting occurrence of the second signal in response to determining that a pulse width of a pulse of the plurality of pulses differs from the first pulse width, and identifies a third time in response to the second sync signal; and
      (3) an arithmetic circuit that determines a first duration in response to the first time and the second time, determines a second duration in response to the first time and the third time, determines a ratio comprising the first duration divided by the second duration, and provides the drive signal in response to the ratio; and
   c. a head positioner that moves the head toward the center line in response to the drive signal.

8. The servo system of claim 7 wherein the arithmetic circuit provides the drive signal in further response to a moving average of a plurality of values of the ratio.

9. The servo system of claim 7 wherein the arithmetic circuit further determines a difference between a reference value and the ratio and provides the drive signal in response to the difference.

10. The servo system of claim 7 wherein:
   a. the arithmetic circuit further determines a first range signal in response to the second duration; and
   b. the first range check circuit identifies the first range in response to the first range signal.

11. The servo system of claim 10 wherein the first range check circuit comprises:
   a. an edge detect circuit that provides, in response to the first signal, a leading edge signal and a trailing edge signal;
   b. a clock circuit that provides a clock signal;
   c. a register that stores the first range in response to the first range signal;
   d. a counter circuit responsive to the leading edge signal for receiving the first range as a starting value and responsive to the trailing edge signal for ceasing counting thereby determining a terminal value; and
   e. a comparator circuit that provides the sync signal in response to the terminal value.

12. The servo system of claim 7 wherein:
   a. the first signal comprises a positive pulse and a negative pulse; and
   b. the first range check circuit provides the first sync signal when the positive pulse is characterized by the first pulse width within the first range and the negative pulse is characterized by the first pulse width within the first range.

13. The servo system of claim 7 wherein:
   a. the first signal comprises in sequence a first pulse having a first polarity, a second pulse having a second polarity opposite the first polarity, a third pulse having the first polarity, and a fourth pulse having the second polarity; and
   b. the first range check circuit provides the first sync signal when each pulse of the set consisting of the first pulse, the second pulse, the third pulse, and the fourth pulse, is characterized by the first pulse width within the first range.

14. The servo system of claim 7 wherein:
   a. the discriminator circuit further comprises a second range check circuit that provides a position signal in response to the second signal when the second pulse width is within a second range; and
   b. the timing circuit identifies the second time in further response to the position signal.

15. The servo system of claim 14 wherein:
   a. the arithmetic circuit further determines a second range signal in response to the second duration; and
   b. the second range check circuit identifies the second range in response to the second range signal.

16. The servo system of claim 14 wherein:
   a. the second signal comprises a positive pulse and a negative pulse; and
   b. the second range check circuit provides the position signal when the positive pulse is characterized by the second pulse width within the second range and the negative pulse is characterized by the second pulse width within the second range.

17. The servo system of claim 14 wherein:
   a. the second signal comprises in sequence a first pulse having a first polarity, a second pulse having a second polarity opposite the first polarity, a third pulse having the first polarity, and a fourth pulse having the second polarity; and
   b. the second range check circuit provides the position signal when each pulse of the set consisting of the first pulse, the second pulse, the third pulse, and the fourth pulse, is characterized by the second pulse width within the second range.

18. The servo system of claim 7 wherein:
   a. the discriminator circuit further comprises a digital to analog converter that provides an analog drive signal in response to the ratio; and
   b. the head positioner is further responsive to the analog drive signal for moving the head.

19. The servo system of claim 18 wherein:
   a. the discriminator circuit further comprises an analog compensation circuit that provides a compensated drive signal in response to the analog drive signal; and
   b. the head positioner is further responsive to the compensated analog drive signal for moving the head.

20. The servo system of claim 19 wherein:
   a. the head positioner provides an analog position signal; and
   b. the analog compensation circuit provides the compensated analog drive signal in further response to the analog position signal.

* * * * *